United States Patent
Berhorst, II

(10) Patent No.: US 10,735,371 B2
(45) Date of Patent: Aug. 4, 2020

(54) SYSTEMS AND METHODS FOR ACCESSING COMPUTER NETWORKS USING A VIRTUAL INFRASTRUCTURE

(71) Applicant: MasterCard International Incorporated, Purchase, NY (US)

(72) Inventor: Richard J. Berhorst, II, Wright City, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 203 days.

(21) Appl. No.: 15/711,138

(22) Filed: Sep. 21, 2017

(65) Prior Publication Data
US 2019/0089673 A1 Mar. 21, 2019

(51) Int. Cl.
| | |
|---|---|
| G06F 15/173 | (2006.01) |
| H04L 29/12 | (2006.01) |
| H04L 29/08 | (2006.01) |
| H04W 84/04 | (2009.01) |
| H04L 29/06 | (2006.01) |
| H04L 12/701 | (2013.01) |
| H04L 12/715 | (2013.01) |

(52) U.S. Cl.
CPC ......... *H04L 61/2007* (2013.01); *H04L 45/00* (2013.01); *H04L 45/04* (2013.01); *H04L 63/0218* (2013.01); *H04L 63/0227* (2013.01); *H04L 67/1089* (2013.01); *H04W 84/04* (2013.01); *H04L 61/2514* (2013.01); *H04L 61/6004* (2013.01)

(58) Field of Classification Search
None
See application file for complete search history.

(56) References Cited

U.S. PATENT DOCUMENTS

| | | |
|---|---|---|
| 6,339,595 B1 | 1/2002 | Rekhter et al. |
| 7,039,687 B1 | 5/2006 | Jamieson et al. |
| 8,005,088 B2 | 8/2011 | Elias et al. |
| 8,307,422 B2 | 11/2012 | Varadhan et al. |
| 8,316,435 B1 | 11/2012 | Varadhan et al. |
| 9,036,504 B1 | 5/2015 | Miller et al. |
| 9,722,871 B2 | 8/2017 | Miller et al. |

(Continued)

*Primary Examiner* — Brian Whipple
*Assistant Examiner* — Anthony T Rotolo
(74) *Attorney, Agent, or Firm* — Armstrong Teasdale LLP

(57) ABSTRACT

A network management (NM) computing system generates a first work zone associated with a first remote network and a second work zone associated with a second remote network. Each work zone includes a respective virtual firewall and a respective virtual jump host. The NM computing system establishes a first and second communication path between the first virtual jump host and the first remote network via a multiprotocol layer switching network system, receives a data packet including a firewall identifier associated with the first virtual firewall and a local address associated with a destination device within the first remote network, routes the data packet through the first firewall to the first virtual jump host based on the firewall identifier, and transmits, by the first virtual jump host, the data packet to the first remote network using the first communication path and/or the second communication path.

23 Claims, 6 Drawing Sheets

(56) References Cited

U.S. PATENT DOCUMENTS

| | | | |
|---|---|---|---|
| 2012/0014387 A1* | 1/2012 | Dunbar | H04L 12/4625 370/395.53 |
| 2014/0280940 A1 | 9/2014 | Chapman et al. | |
| 2016/0205002 A1* | 7/2016 | Rieke | H04L 41/142 709/224 |
| 2018/0034668 A1* | 2/2018 | Mayya | H04L 41/5041 |
| 2018/0041470 A1* | 2/2018 | Schultz | H04L 63/029 |
| 2018/0367499 A1* | 12/2018 | Bansal | H04L 61/15 |

\* cited by examiner

SYSTEMS AND METHODS FOR ACCESSING COMPUTER NETWORKS USING A VIRTUAL INFRASTRUCTURE

BACKGROUND

The field of the present disclosure relates generally to network communications, and more specifically, resolving address conflicts within a network using isolated virtual work zones.

Data communication networks enable data transmission between various computing devices. The data communication networks may include public networks (e.g., the internet) and private networks (e.g., company networks and personal networks). Each computing device connected to a network is assigned an address to enable other devices within the network to identify and communicate with the computing device. The address may include, for example, an internet protocol (IP) address. In at least some known systems, IP addresses are assigned to computing devices within a network without consideration of the addresses assigned in other networks, and thus at least some IP addresses in two different networks may overlap.

In some embodiments, several data communication networks may be merged together to form a global network. For example, a business entity may have different networks for different locations of the business entity. Merging the different networks into a global network enables computing devices between the two networks to communicate. However, the merged networks may include computing devices having overlapping IP addresses, otherwise known as an address conflict. When transmitting data packets to computing devices having an address conflict, the data packet may be delivered to the incorrect recipient, the data packet may be corrupted during transmittal, and/or the data packet may not be transmitted at all. In some embodiments, to resolve any address conflicts between networks, IP addresses may be reassigned across the global network such that each device within the network has a unique address. However, network devices, scripts, applications, and processes that rely upon the addresses to transmit and receive data may not be configured to automatically update to use the addresses from the reassignment. For example, a script may include a static or hard-coded IP address for a particular computing device within its instructions. To update the script, a user must manually update the script with the new address of the computing device. This process may be time-consuming and affect the performance of a service associated with the software being updated, especially if hundreds or even thousands of network devices, scripts, applications, processes, and the like may need to be checked and adjusted based on the reassigned addresses.

BRIEF DESCRIPTION

In one aspect, a network management (NM) computing system includes at least one processor and a memory in communication with the processor. The processor is programmed to generate a first work zone associated with a first remote network and a second work zone associated with a second remote network. The first work zone includes a first virtual firewall and first virtual jump host, and the second work zone includes a second virtual firewall and a second virtual jump host. The first work zone is isolated from the second work zone by the first firewall and the second firewall. The processor is further programmed to establish a first communication path and a second communication path between the first virtual jump host and the first remote network via a multiprotocol layer switching (MPLS) network system, receive a data packet including a firewall identifier associated with the first virtual firewall and a local address associated with a destination device within the first remote network, route the data packet through the first firewall to the first virtual jump host based on the firewall identifier, and transmit, by the first virtual jump host, the data packet to the first remote network for the destination device using at least one of the first communication path and the second communication path.

In another aspect, a method for managing access to remote networks is provided. The method is at least partially performed by an NM computing system. The method includes generating a first work zone associated with a first remote network and a second work zone associated with a second remote network. The first work zone includes a first virtual firewall and first virtual jump host, and the second work zone includes a second virtual firewall and a second virtual jump host. The first work zone is isolated from the second work zone by the first virtual firewall and the second virtual firewall. The method further includes establishing a first communication path and a second communication path between the first virtual jump host and the first remote network via an MPLS network system, receiving a data packet including a firewall identifier associated with the first virtual firewall and a local address associated with a destination device within the first remote network, routing the data packet through the first firewall to the first virtual jump host based on the firewall identifier, and transmitting, by the first virtual jump host, the data packet to the first remote network for the destination device using at least one of the first communication path and the second communication path.

In yet another aspect, at least one non-transitory computer-readable storage media having computer-executable instructions embodied thereon is provided. When executed by at least one processor, the computer-executable instructions cause the processor to generate a first work zone associated with a first remote network and a second work zone associated with a second remote network. The first work zone includes a first virtual firewall and first virtual jump host, and the second work zone includes a second virtual firewall and a second virtual jump host. The first work zone is isolated from the second work zone by the first virtual firewall and the second virtual firewall. The computer-executable instructions further cause the processor to establish a first communication path and a second communication path between the first virtual jump host and the first remote network via an MPLS network system, receive a data packet including a firewall identifier associated with the first virtual firewall and a local address associated with a destination device within the first remote network, route the data packet through the first firewall to the first virtual jump host based on the firewall identifier, and transmit, by the first virtual jump host, the data packet to the first remote network for the destination device using at least one of the first communication path and the second communication path.

BRIEF DESCRIPTION OF THE DRAWINGS

FIG. 1 is a block diagram illustrating an example network management (NM) system for facilitating data communication with remote networks in accordance with one embodiment of the disclosure.

FIG. 2 is an example data schematic of the system shown in FIG. 1.

FIG. 3 is an expanded block diagram of an example embodiment of a remote device for use in the system shown in FIG. 1.

FIG. 4 illustrates an example configuration of a host system for use in the system shown in FIG. 1.

FIG. 5 is a flowchart of an example process for managing access to remote networks that may be performed by the system shown in FIG. 1.

FIG. 6 is a diagram of components of one or more example computing devices that may be used in embodiments of the described systems and methods.

DETAILED DESCRIPTION

Figure 1:
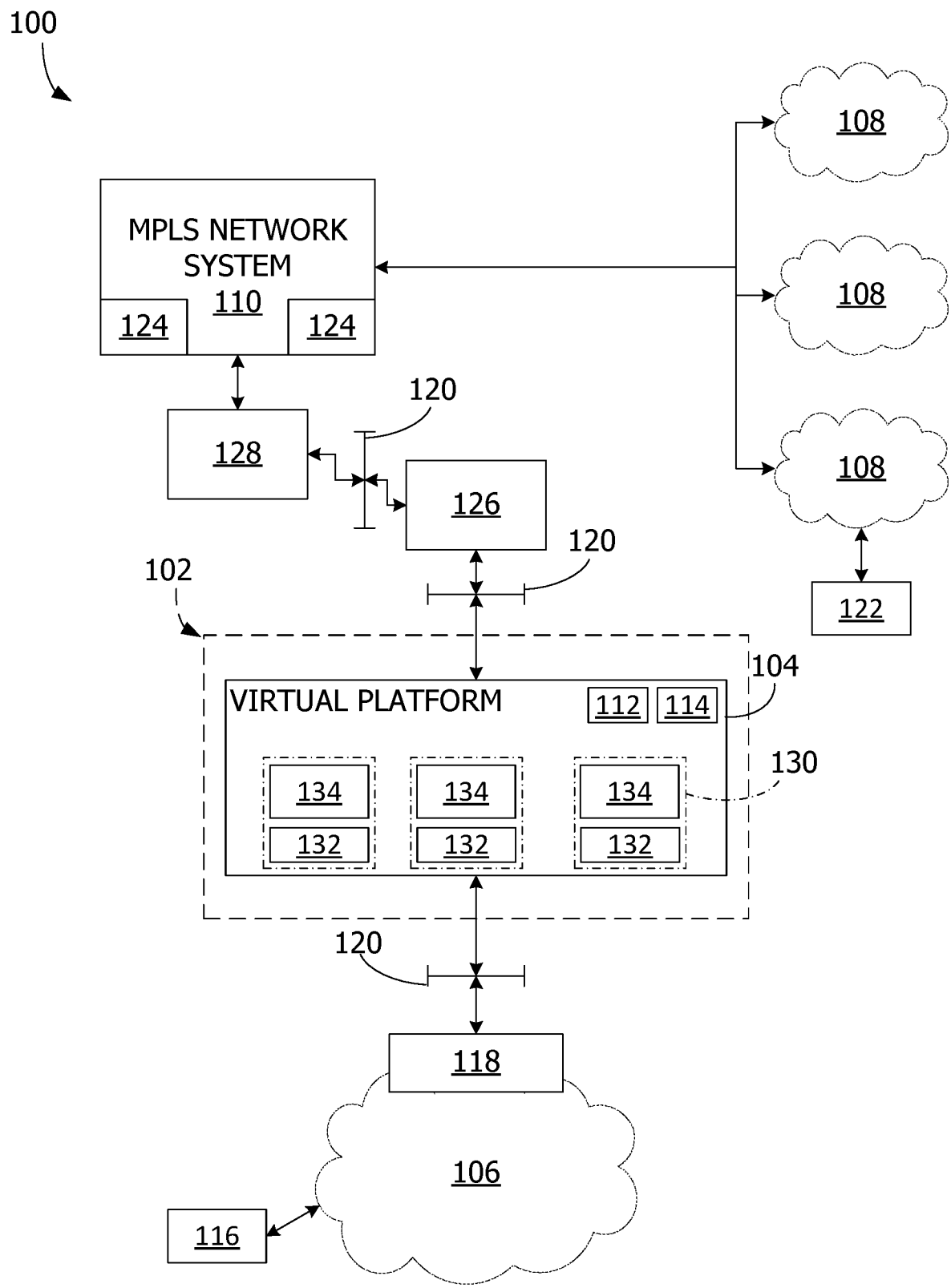
FIGS. 1-6 show example embodiments of the methods and systems described herein.

Systems and methods according to this disclosure are directed to network communications, and more specifically, resolving address conflicts within a network using isolated virtual work zones.

A network management (NM) system is described herein for managing access to remote networks within a global network. The global network is a data communication network including a primary network and a plurality of remote networks in communication with the primary network. The primary network includes one or more network devices and one or more network access computing devices. The network devices are configured to facilitate data communication by receiving, transmitting, and routing data within the network according to one or more data communication protocols, such as Transmission Control Protocol/Internet Protocol (TCP/IP). The network devices may include, for example, network switches, modems, routers, network hubs, network bridges, network gateways, and the like. The network access computing devices are computing devices (e.g., a laptop, a desktop, a smartphone, a server, etc.) in communication with the network devices to receive and transmit data within the network. The network access computing devices may be communicatively coupled to the network devices using any suitable wireless or wired communication methods. Each network access computing device is assigned a network address (e.g., an internet protocol (IP) address) to enable the network devices to determine a sender and/or a recipient of data within the network. In at least some embodiments, at least some network devices may also be network access computing devices such that the network devices may be assigned a network address as well. Each network includes a corresponding routing table with every IP address within the network to enable the network devices to identify the sender and/or recipient of a data packet.

The remote networks are similar to the primary network. That is, the remote networks include network devices and/or network access computing devices. In some embodiments, the remote networks are associated with locations geographically remote from the location associated with the primary network. Additionally or alternatively, the remote networks may be configured to store data, applications, and/or other information and tools. In the example embodiment, the primary network is configured to access the remote networks individually for data communication. The remote networks are not in direct communication with each other such that communication between the remote networks within the global network is limited to communications involving the primary network in-between.

In the example embodiment, the global network further includes a multiprotocol layer switching (MPLS) network system communicatively coupled between the primary network and each of the remote networks. The MPLS network system includes one or more MPLS networks that facilitate transmission of data between the primary and remote networks. MPLS networks include a plurality of interconnected network devices that establish internal communication paths based upon a set of predefined networking rules. In one example, the MPLS network includes three MPLS networks for communicatively coupling to the primary and remote networks. In the example embodiment, each remote network includes one or more service delivery point (SDP) devices for transmitting data to and receiving data from the MPLS network system. The SDP device is a network device, such as a router. The remote network may include a separate SDP device for each connected MPLS network. The SDP devices are configured to broadcast a corresponding routing table to the MPLS network system to facilitate transmittal of data packets to devices within the remote network.

In the example embodiment, the NM system is communicatively coupled between the primary network and the MPLS network system to manage data communication between the primary network and each remote network. More specifically, the NM system is configured to isolate the primary network and each remote network from each other to isolate the routing tables of each network from each other, thereby preventing address conflicts between networks. Preventing address conflicts enables additional remote networks to be added to the global network without requiring manual resolution of the potential address conflicts.

In the example embodiment, the NM system includes one or more server computing devices to provide a virtual platform for the primary network to access. The virtual platform is configured to enable devices of the primary network to communicate to devices of the remote networks even if the IP addresses in the remote and/or primary networks overlap with each other. For example, a primary network device may conflict (e.g., have the same IP address as) another primary network device. Additionally or alternatively, a primary network device may conflict with a device connected to a remote network. In particular, the virtual platform provides virtual firewalls and other virtual infrastructure to isolate the communication paths or channels to each remote network. Using virtual infrastructure to isolate the communication paths facilitates efficient use of the physical infrastructure forming the NM system (i.e., the server computing device(s)).

To access the virtual platform and communicate with a remote network, a sender device (i.e., a network access device) of the primary network is authenticated through an internal demilitarized zone (iDMZ) firewall. The iDMZ firewall is configured to selectively permit access to the virtual platform based upon a set of permission rules. The permission rules may limit which remote networks a user or a particular network access device can access. Other suitable security measures may be enforced by the iDMZ firewall to prevent fraudulent or unauthorized access to the virtual platform and the remote networks. The sender device transmits and receives data packets with the remote networks via the virtual platform. The data packets include a payload and a recipient address. The recipient address includes a local address of a destination device within a remote network. The local address is an IP address of the destination device. In some embodiments, the data packets also include a sender address associated with a sender of the data packets.

The NM system is configured to generate a plurality of work zones. Each work zone is associated with a remote network. A work zone is an isolated portion of the virtual platform that is accessed to communicate with the corresponding remote network. In the example embodiment, a work zone includes a virtual jump host and a virtual firewall. The virtual jump host is a virtualized instance of a host computing device (e.g., a server) that operates as a gateway between the primary network and the MPLS network system. The virtual jump host separates the primary network and the MPLS network system to prevent direct access to each other, thereby increasing the security of the global network. In addition, each virtual jump host is communicatively coupled to a single remote network to prevent address conflicts. In some embodiments, the virtual jump hosts may be communicatively coupled to a subset of remote networks (i.e., one or more remote networks) that have been configured to resolve and remove address conflicts. The virtual jump hosts are configured to receive data packets from the primary network and facilitate transmission to the remote networks.

The virtual firewall is configured to monitor and filter data packets between the primary network and the virtual jump host. More specifically, the virtual firewall blocks data packets that are not intended for the corresponding remote network from being received at the virtual jump host and permits data packets intended for the remote network to be received by the virtual jump host for transmission. In the example embodiment, each virtual firewall is associated with a respective firewall identifier. The firewall identifier is included with the recipient address of the data packets transmitted to the virtual platform to identify an intended destination of the data packets. The virtual firewalls are configured to permit data packets including the corresponding firewall identifier and to filter or block data packets including other firewall identifiers. In at least some embodiments, the virtual firewalls may be configured to extract or remove the firewall identifier from the recipient address such that the local address remains.

In the example embodiment, after the work zones are generated, the NM system is configured to establish communication paths between the virtual platform and the remote networks. The communication paths are communication channels across one or more network devices that transport data packets between the virtual platform and the remote networks. The communication paths are at least partially established through the MPLS network system and the SDP devices of the corresponding remote networks. Establishing the communication paths may include, for example, configuring network devices for data communication with a particular virtual jump host. In one example, establishing the communication paths includes configuring specific network ports and the like of network devices to define each communication path.

In at least some embodiments, one or more network-to-network (NNI) devices and customer edge (CE) devices are network devices communicatively coupled between the virtual platform of the NM system and the MPLS network system. In at least some embodiments, the NNI devices and the CE devices are routers. The NNI devices are configured to manage communication between the virtual platform and the MPLS network system. The CE devices are configured to transmit data packets to and receive data packets from the MPLS network system. In at least some embodiments, each CE device is associated with a particular MPLS network within the MPLS network system. In such embodiments, the NNI devices are configured to drive traffic from the NM system to a particular MPLS network via a corresponding CE device. The NNI devices and/or the CE devices are configured to provide a plurality of virtual instances using virtual routing and forwarding (VRF) to facilitate isolated communications with each work zone using the same physical infrastructure. That is, the communication paths are defined through the NNI and CE devices. The virtual instances are identifiable by the virtual jump hosts and operate similar to or the same as the physical NNI or CE devices. In the example embodiment, each virtual jump host is communicatively coupled to a corresponding virtual instance that defines a portion of the communication path.

In the example embodiment, the MPLS network system supports VRF to enable each communication path to remain separate from each other. More specifically, the network devices within the MPLS network system are configured to provide virtual and/or physical instances to establish each communication path. In other embodiments, the MPLS network system is configured to identify a communication path associated with a received data packet and transmit the data packet to the destination accordingly. In at least some embodiments, additional metadata is attached to the data packet by the NNI devices, the CE devices, and/or the MPLS network system to facilitate navigation through the MPLS network system without modifying the data within the data packet or requiring the sender to have prior knowledge of the communication path. For example, the NNI device is configured to receive the data packet and attach additional metadata using VRF to specify a communication path and destination of the data packet.

In the example embodiment, two or more communication paths are established for each work zone. Establishing multiple communication paths facilitates redundancy and flexibility in transmitting data packets. That is, if one communication path is congested or an error has occurred, the data packets are still transmitted over the other communication path. In the example embodiment, each communication path is established using different MPLS networks. In certain embodiments, each MPLS network is associated with a different MPLS network provider.

In at least some embodiments, at least some communication paths include a plurality of subpaths. The subpaths are configured to enable different types of data to be transmitted separately using the communication path. In one embodiment, the communication path includes a first subpath configured to transmit management data and a second subpath configured to provide access to the devices within the corresponding remote network and the data stored by the devices. The management data is data used to monitor, manage, and/or control the remote network. For example, the management data may include instructions or commands to be executed by administrative devices managing the remote network. In other embodiments, the communication paths may include additional, fewer, or alternative subpaths for particular tasks or features.

After the communication paths are established, the NM system is configured to receive data packets from the primary network for transmission to a particular remote network. In some embodiments, the data packets include a connection request to establish data communication between a sender device of the primary network and a destination device of the remote network. The NM system is configured to analyze the firewall identifier of each data packet to identify a corresponding virtual firewall. The data packet is then routed through the virtual firewall to the virtual jump host. In some embodiments, each data packet is broadcasted to each firewall. The firewalls are configured to examine the firewall identifier and filter data packets that do not include a corresponding firewall identifier. In other embodiments, a network device receives the data packet, analyzes the firewall identifier, and routes the data packet to the corresponding virtual firewall. In the example embodiment, the virtual firewall extracts the firewall identifier from the data packet as the data packet is forwarded to the virtual jump host.

In some embodiments, when the virtual jump host receives the data packet, the virtual jump host is configured to format the data packet for transmission. That is, the virtual jump host organizes data elements within the data packet and/or generates new data elements according to the supported format of a particular communication path.

The virtual jump host is configured to transmit the data packet to the remote network of the destination device using at least one of the communication paths established between the virtual jump host and the remote network. In the example embodiment, the virtual jump host transmits the data packet over both communication paths. The virtual jump host is configured to assign a priority indicator to the data packet to prioritize transmission of the data packet over one of the communication paths. In particular, the MPLS network system is configured to detect priority indicator and adjust transmission of the data packet through the MPLS networks accordingly. The virtual jump host advertises the data packet without the priority indicator over one communication path and advertises the data packet with the priority indicator over the other communication path. In some embodiments, the priority indicator is a border gateway protocol (BGP) prepend that is added to the data packet. The BGP prepend is configured to cause the MPLS network system to extend the communication path through the MPLS networks. That is, the data packet with the BGP prepend is delayed to prioritize the communication path associated with the data packet advertised without the BGP prepend. In other some embodiments, the priority indicator is a different type of indicator, and may be added to a data packet to increase its priority rather than decrease its priority.

The data packet is then transmitted to the SDP devices of the remote network through the NNI devices, the CE devices, and the MPLS network system. In particular, the data packets are transmitted to the SDP devices using the established communication paths defined through the NNI devices, the CE devices, and the MPLS network system. The SDP devices are configured to receive the data packet and analyze the local address of the data packet to identify the destination device within the remote network. The SDP devices then route the data packet to the destination device to complete the transmission. In some embodiments, the destination device transmits data back to the sender device via the communication paths in response to the data packets. For example, the sender device may request data stored within the remote network and the destination device retrieves and transmits the requested data back to the sender device through the communication paths and the virtual platform. In at least some embodiments, the virtual platform and/or the iDMZ firewall may prevent unauthorized access to the primary network by network access devices within the remote networks.

The methods and systems described herein may be implemented using computer programming or engineering techniques including computer software, firmware, hardware or any combination or subset thereof, wherein the technical effects may be achieved by performing one of the following steps: (i) generating a plurality of work zones associated with a plurality of remote networks in a virtual platform, wherein each work zone is isolated from the other work zones and includes a virtual firewall and a virtual jump host; (ii) establishing at least two communication paths between the virtual jump host and the corresponding remote network via an MPLS network system for each work zone; (iii) receiving data packets including a firewall identifier and a local address associated with a destination device within a remote network; (iv) routing the data packets through a firewall corresponding to the remote network to the virtual jump host based on the firewall identifier; and (v) transmitting, by the virtual jump host, the data packets to the remote network for the destination device using at least one of the established communication paths.

The systems and methods described herein are configured to facilitate (a) resolving address conflicts between merged networks without a global reassignment of network addresses and manually reconfiguring processes, applications, and the like for the reassignment; (b) communication between network access computing devices in different local networks; (c) increased network and processing bandwidth for the NM system by removing the firewall identifier from the recipient address; (d) increased security between remote networks by physically and/or virtually isolating communication paths of one remote network from the rest of the remote networks; and (e) reduced costs by using virtualization to isolate communication paths rather than purchasing new physical infrastructure to establish new communication paths.

Described herein are computer systems such as a host computing device, network access computing devices, and an NM computing system. As described herein, all such computer systems include at least one processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium.

In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to route data packets in a distributed network system.

FIG. 1 is a block diagram of an example network management (NM) system 102 in a global network 100. In the example embodiment, NM system 102 includes a virtual platform 104. Global network 100 includes a primary network 106, a plurality of remote networks 108, and an MPLS network system 110. Although one primary network 106 and three remote networks 108 are shown, it is to be understood that global network 100 may include any suitable number of primary networks 106 and/or remote networks 108. In other embodiments, global network 100 and/or system 102 include additional, fewer, or alternative components, including those described elsewhere herein.

Virtual platform 104 is one or more server computing devices communicatively coupled together that are configured to generate and maintain virtual instances for data communication within global network 100. As used herein, a "virtual instance" is a software application that emulates or operates like a physical device or infrastructure and is separately identifiable. Virtual platform 104 includes one or more processors 112 and one or more memory devices 114 in communication with processors 112. Memory devices 114 store computer-executable instructions that, when executed by processors 112, cause processors 112 to create virtual instances and perform steps as described herein to facilitate communication.

Primary network 106 is communicatively coupled to virtual platform 104 of NM system 102 to communicate with remote networks 108. In the example embodiment, global network 100 is configured to enable primary network 106 to access data stored on remote networks 108 while preventing remote networks 108 from accessing primary network 106. In other embodiments, global network 100 is configured to enable bidirectional access between primary network 106 and remote networks 108.

Primary network 106 includes one or more network devices and one or more network access computing devices (both not shown). The network access computing devices access primary network 106 to transmit and receive data from global network 100. In the example embodiment, primary network 106 includes a sender device 116. Sender device 116 is a network access computing device configured for data communication within global network 100. Sender device 116 may be, but is not limited to, a server computing device or a user computing device (e.g., a laptop, a desktop computer, a smartphone, a tablet, a smart electronic device, etc.). In at least some embodiments, primary network 106 includes a plurality of sender devices 116.

Primary network 106 is communicatively coupled to NM system 102 through an iDMZ firewall 118 and a set of network devices 120. iDMZ firewall 118 is configured to monitor and manage data traffic between primary network 106 and global network 100. In certain embodiments, where primary network 106 is a partition of global network 100, iDMZ firewall 118 is configured to monitor and manage data traffic between primary network 106 and NM system 102 (e.g., virtual platform 104). In the example embodiment, iDMZ firewall 118 is configured to authenticate sender device 116 when sender device 116 attempts to communicate with remote networks 108. In at least some embodiments, iDMZ firewall 118 has a set of permission rules and is configured to determine whether or not sender device 116 has permission to access a particular remote network 108. iDMZ firewall 118 may be configured to provide other suitable security measures to prevent fraudulent or unauthorized access to global network 100 and/or primary network 106. In one example, iDMZ firewall 118 monitors incoming data traffic from remote networks 108 to primary network 106 and selectively filters the data based on a set of rules. Network devices 120 facilitate data communication between primary network 106 and virtual platform 104. Network devices 120 may include, but are not limited to, routers and network switches. In one example, network devices 120 include a plurality of layer 2 network switches.

Remote networks 108 are communicatively coupled to NM system 102 through MPLS network system 110. Remote networks 108 include one or more network devices and network access computing devices (both not shown). In some examples, the network access computing devices include a database for storing data. For example, remote network 108 may be a data center for storing data. In the example embodiment, remote network 108 includes a destination device 122. Destination device 122 is a network access computing device communicatively coupled to one remote network 108. Destination device 122 is configured to receive data packets from primary network 106 (via NM system 102 and MPLS network system 110) and transmit data packets back to primary network 106. In some embodiments, destination device 122 may be configured to communicate with other remote networks 108 and/or access primary network 106.

MPLS network system 110 includes one or more MPLS networks 124. MPLS networks 124 are a plurality of interconnected network devices that route data using label-based switching. That is, data packets received by MPLS networks 124 are assigned a label and are routed through networks 124 based on the label. The label is removed from the data packet at each network device in network 124 and the data packet is assigned a new label until the data packet reaches the edge of network 124. MPLS networks 124 are configured to support multiple communication protocols of data packets, thereby improving flexibility of data communication through MPLS network system 110. In the example embodiment, MPLS network system 110 supports virtualization as described herein to isolate communication paths. In one example, MPLS network system 110 supports VRF and/or virtual private network (VPN) features for virtualization.

In at least some embodiments, MPLS networks 124 are separate from each other. In one example, different network providers may provide MPLS networks 124. MPLS networks 124 are connected to each remote network 108 separately to facilitate isolated communications between remote networks 108 and NM computing device 102. MPLS network system 110 is communicatively coupled to NM system 102 via a set of NNI devices 126 and a set of CE devices 128. NNI devices 126 are configured to manage communication between virtual platform 104 and MPLS network system 110. In one embodiment, NNI devices 128 apply labels or other metadata to the data packet to facilitate navigation through MPLS network system 110. CE devices 128 are configured to advertise data packets to and receive data packets from MPLS network system 110. In at least some embodiments, each CE device 128 is associated with a particular MPLS network 124. In such embodiments, NNI devices 126 may be configured to drive data traffic to particular MPLS networks 124 via a corresponding CE device 128. NNI devices 126 and/or the CE devices 128 are configured to provide a plurality of virtual instances using virtual routing and forwarding (VRF) to facilitate isolated communications with remote network 108 using the same physical infrastructure. That is, each NNI device 126 and/or CE device 128 is configured to provide multiple, isolated data communication paths for multiple remote networks 108. Network devices 120 are used to segregate NM system 102, NNI devices 126, CE devices 128, and MPLS network system 110. Segregating these devices enables the use of multiple NNI devices 126 and CE devices 128 in addition to multiple communication paths. In other embodiments, other suitable communication protocols and techniques may be used to facilitate isolated communication paths.

In the example embodiment, NM system 102 is configured to facilitate isolated data communication between primary network 106 and each remote network 108. Isolating data communication prevents address conflicts between primary network 106 and remote networks 108 without requiring a global reassignment of network addresses within global network 100 and enables new remote networks 108 to be added to global network 100. In the example embodiment, NM system 102, MPLS network system 100, NNI devices 126, and CE devices 128 are configured to provide isolated communication paths to each remote network 108 using virtualization such that the physical infrastructure (i.e., server computing devices, routers, network switches, etc.) provides multiple communication paths. Virtualization reduces costs associated with purchasing physical infrastructure to add communication paths by efficiently using the existing physical infrastructure. Moreover, NM system 102 is configured to facilitate communications between primary network 106 and remote networks 108 without requiring sender device 116 to have complete knowledge of the communication path to destination device 122.

Virtual platform 104 is configured to generate work zones 130 for each remote network 108. Work zones 130 operate as a gateway to one or more communication paths between virtual platform 104 and a corresponding remote network 108. In at least some embodiments, work zones 130 are identifiable by sender device 116 to enable sender device 116 to transmit data packets to a particular work zone 130. In other embodiments, iDMZ firewall 118 is configured to identify work zone 130 and updates data packets from sender device 116 to route the data packets to the correct work zone 130.

Each work zone 130 includes a virtual firewall 132 and one or more virtual jump hosts 134. Virtual firewalls 132 and virtual jump hosts 134 are virtual instances provided by the physical infrastructure of virtual platform 104 (i.e., one or more server computing devices). Virtual firewalls 132 are configured to monitor data packets transmitted between primary network 106 and virtual platform 104. More specifically, virtual firewalls 132 are configured to selectively filter data packets such that only data packets intended for the specific firewall 132 are permitted to pass through firewall 132. Virtual firewalls 132 isolate each remote network 108 from each other by blocking data packets that are not intended for the associated remote network 108, thereby preventing address conflicts even if the data packets have a local address associated with multiple devices across all of remote networks 108. Virtual firewalls 132 are associated with one or more firewall identifiers (not shown in FIG. 1) that are used to identify which virtual firewall 132 a data packet is intended to be received by. In some embodiments, virtual firewalls 132 include other security features, such as authentication features, data quality features, and the like.

Virtual jump hosts 134 operate as host computing devices (e.g., server computing devices) and are configured to segregate primary network 106 from MPLS network system 110 and remote networks 108. Each virtual jump host 134 is communicatively coupled to one or more separate communication paths to a corresponding remote network 108. In some embodiments, at least some remote networks 108 are communicatively coupled to a plurality of virtual jump hosts 134. In other embodiments, at least some virtual jump hosts 134 are communicatively coupled to multiple remote networks 108 via separate communication paths. When a data packet is received through virtual firewall 132, virtual jump host 134 is configured to transmit the data packet through one or more communication paths to deliver the data packet to a recipient remote network 108. In certain embodiments, virtual jump host 134 is configured to provide one or more security features to monitor the data packet traffic. In some embodiments, virtual jump host 134 is configured to provide persistent communication paths to remote network 108. In other embodiments, virtual jump host 134 connects to remote network 108 via a previously established communication path when one or more data packets intended for remote network 108 are received.

Figure 2:
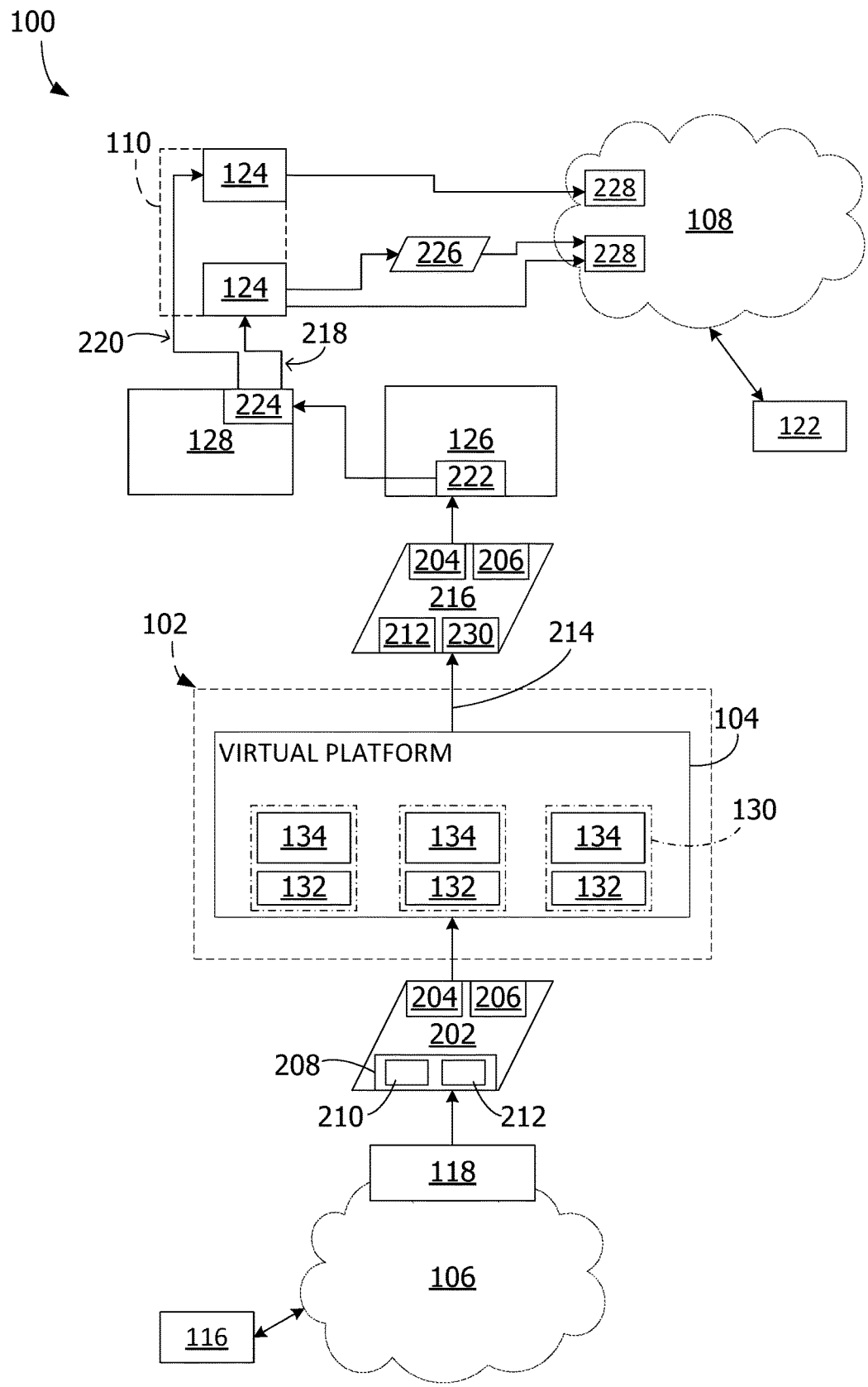

FIG. 2 is a data flow diagram of an exemplary process performed by NM system 102 within global network 100 to transmit data between sender device 116 and destination device 122 (each shown in FIG. 1). In other embodiments, additional, fewer, or alternative data is stored and/or exchanged, including those described elsewhere herein.

With respect to FIGS. 1 and 2, a data packet 202 is generated by sender device 116 for transmission to destination device 122. Data packet 202 includes a data payload 204, a sender address 206, and a recipient address 208. Data payload 204 is data, requests (e.g., requests for data or to communicate), computer-executable instructions, and the like that sender device 116 is sending to destination device 122. Sender address 206 identifies sender devices and/or primary network 106. In the example embodiment, sender address 206 is an IP address associated with sender device 116. Recipient address 208 identifies destination device 122 as the intended recipient of data packet 202. In the example embodiment, recipient address 208 includes at least a firewall identifier 210 and a local address 212. Firewall identifier 210 identifies a virtual firewall 132 of virtual platform 104 that corresponds to remote network 108 associated with destination device 122. Firewall identifiers 210 for each virtual firewall 132 may be provided to primary network 106 by virtual platform 104 to facilitate proper routing of data packet 202 to destination device 122. Local address 212 is an address associated with destination device 122 within remote network 108. Primary network 106 may be configured to enable sender device 116 to access routing tables of remote network 108 and the like to identify the correct local address for packet 202. In the example embodiment, local address 212 is an IP address. In certain embodiments, recipient address 208 is an IPv6 address that includes both firewall identifier 210 and local address 212. In such embodiments, local address 212 may be an IPv4 address. In other embodiments, firewall identifier 210 and local address 212 may be separate from each other.

When data packet 202 is received by virtual platform 104, virtual firewalls 132 analyze firewall identifier 210 to determine whether or not to filter data packet 202 to prevent data packet 202 from being transmitted to remote networks that do not include destination device 122. When one virtual firewall 132 detects a corresponding firewall identifier 210 with data packet 202, virtual firewall 132 permits data packet 202 to be received by virtual jump host 134. In at least some embodiments, virtual firewall 132 or virtual jump host 134 is configured to extract firewall identifier 210 from recipient address 208, thereby leaving local address 212. Removing firewall identifier 210 enables remote network 108 to handle data packet 202 the same as other data packets transmitted locally within remote network 108 without requiring substantive reconfiguration of remote network 108. In some embodiments, for data packets 202 to be transmitted to sender device 116 through virtual platform 104, virtual firewall 132 may add firewall identifier 210 to data packet 202.

In the example embodiment, virtual jump host 134 is configured to establish a set of communication paths 214 between virtual platform 104 and remote network 108 to transmit a modified data packet 216. The set of communication paths 214 includes one or more communication paths that are isolated from each other. In the example embodiment, communication paths 214 include a first communication path 218 and a second communication path 220. Each communication path 214 is defined through virtual instances 222 of NNI devices 126 and virtual instances 224 of CE devices 128. Virtual instances 222, 224 are configured to provide data routing for data packets while isolating data communications associated with different remote networks from each other. In at least some embodiments, communication paths 214 may include subpaths for transmitting specific types of data. That is, each subpath may be associated with a different network port or have a different identifier to differentiate the subpaths. In the example embodiment, first communication path 218 includes a first subpath for transmitting management data 226 and a second subpath for providing data access to and from remote network 108. Management data 226 includes data and instructions for managing or configuring remote network 108 from primary network 106. The second subpath enables primary network 106 to access data stored by remote network 108.

In the example embodiment, each communication path 218, 220 is defined through a separate MPLS network 124 within MPLS network system 110. MPLS networks 124 are communicatively coupled to remote network 108 via one or more SDP devices 228. SDP devices 228 are network devices (e.g., routers) that facilitate data communication between devices within remote network 108 and MPLS networks 124. In at least some embodiments, establishing communication paths 214 causes virtual platform 104, NNI devices 126, CE devices 128, MPLS network system 110, and/or SDP devices 228 to store configurations, settings, and/or other data to facilitate subsequent data communication via communication paths 214. When SDP devices 228 receive modified data packet 216, SDP devices 228 are configured to route modified data packet 216 to destination device 122 based on local address 212.

In the example embodiment, modified data packet 216 is data packet 202 without firewall identifier 210 within recipient address 208. In addition, in the example embodiment, modified data packet 216 includes a priority identifier 230. Priority identifier 230 is configured to cause MPLS network system 110 to prioritize one or more communication paths within the established communication paths such that data traffic is primarily handled by the prioritized communication path 214. In the example embodiment, first communication path 218 is prioritized. Virtual jump host 134, NNI devices 126, and/or CE devices 128 are configured to assign priority identifier 230 to modified data packet 216. Priority identifier 230 is added to modified data packet 216 for either the prioritized communication path or the deprioritized communication path. That is, the absence or presence of priority identifier 230 within packet 216 determines the priority of the corresponding communication path 214. In the example embodiment, priority identifier 230 is a border gateway protocol (BGP) prepend that is assigned to second communication path 220 to prioritize first communication path 218. MPLS networks 124 are configured to use BGP to manage data communications within MPLS networks 124. When packet 216 is advertised to networks 124 with a BGP prepend, a delay is added to extend the network path through MPLS network 124 to SDP devices 228.

Figure 3:
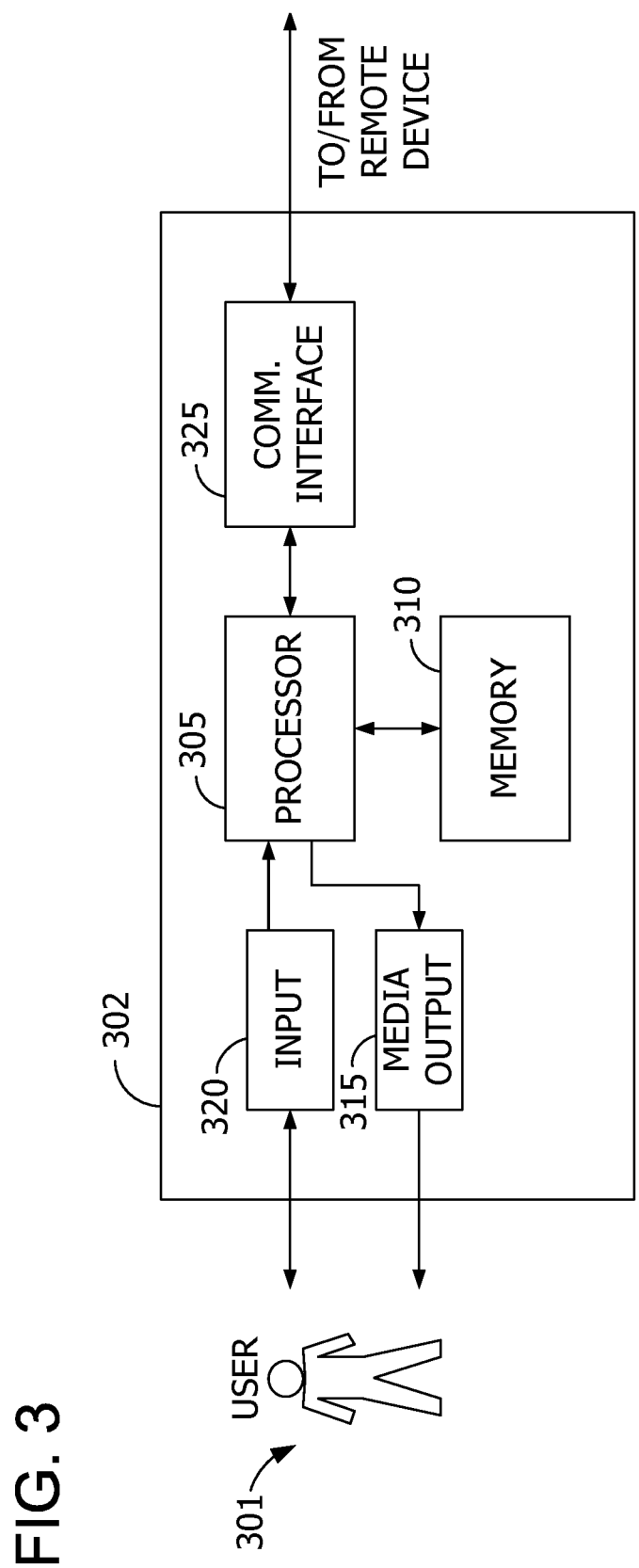

FIG. 3 depicts an exemplary configuration of a remote or user computing device 302, such as sender device 116 and destination device 122 (both shown in FIG. 1). Computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or other data to be stored and retrieved. Memory area 310 may include one or more computer-readable media.

Computing device 302 may also include at least one media output component 315 for presenting information to a user 301. Media output component 315 may be any component capable of conveying information to user 301. In some embodiments, media output component 315 may include an output adapter, such as a video adapter and/or an audio adapter. An output adapter may be operatively coupled to processor 305 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 315 may be configured to present an interactive user interface (e.g., a web browser or client application) to user 301.

In some embodiments, computing device 302 may include an input device 320 for receiving input from user 301. Input device 320 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 315 and input device 320.

Computing device 302 may also include a communication interface 325, which may be communicatively coupleable to a remote device. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer-readable instructions for providing a user interface to user 301 via media output component 315 and, optionally, receiving and processing input from input device 320. A user interface may include, among other possibilities, a web browser and client application. Web browsers enable users 301 to display and interact with media and other information typically embedded on a web page or a website from a web server. A client application allows users 301 to interact with a server application associated with, for example, a virtual platform 104 (shown in FIG. 1).

Figure 4:
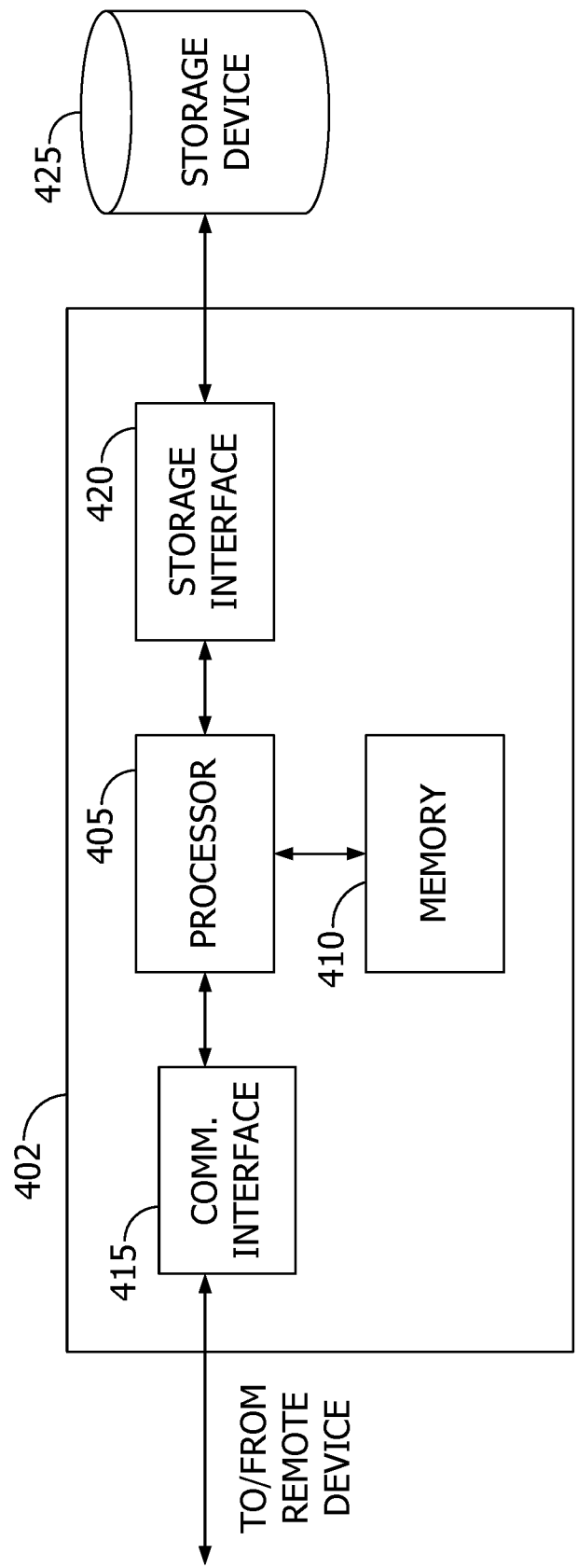

FIG. 4 depicts an exemplary configuration of a host computing device 402, such as sever computing devices forming virtual platform 104 of NM computing system 102 (shown in FIG. 1). Virtual jump hosts 134 (shown in FIG. 1) may be configured to emulate or to operate as a virtual instance of host computing device 402. Host computing device 402 may include a processor 405 for executing instructions. Instructions may be stored in a memory area 410, for example. Processor 405 may include one or more processing units (e.g., in a multi-core configuration).

Processor 405 may be operatively coupled to a communication interface 415 such that host computing device 402 may be capable of communicating with a remote device such as computing device 302 shown in FIG. 3 or another host computing device 402. For example, communication interface 415 may receive requests from user computing device 302 via a respective primary network 106 or remote network 108 of global network 100 (each shown in FIG. 1).

Processor 405 may also be operatively coupled to a storage device 425. Storage device 425 may be any computer-operated hardware suitable for storing and/or retrieving data. In some embodiments, storage device 425 may be integrated in host computing device 402. For example, host computing device 402 may include one or more hard disk drives as storage device 425. In other embodiments, storage device 425 may be external to host computing device 402 and may be accessed by a plurality of host computing devices 402. For example, storage device 425 may include multiple storage units such as hard disks or solid state disks in a redundant array of inexpensive disks (RAID) configuration. Storage device 425 may include a storage area network (SAN) and/or a network attached storage (NAS) system.

In some embodiments, processor 405 may be operatively coupled to storage device 425 via a storage interface 420. Storage interface 420 may be any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Memory areas 310 (shown in FIG. 3) and 410 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 5:
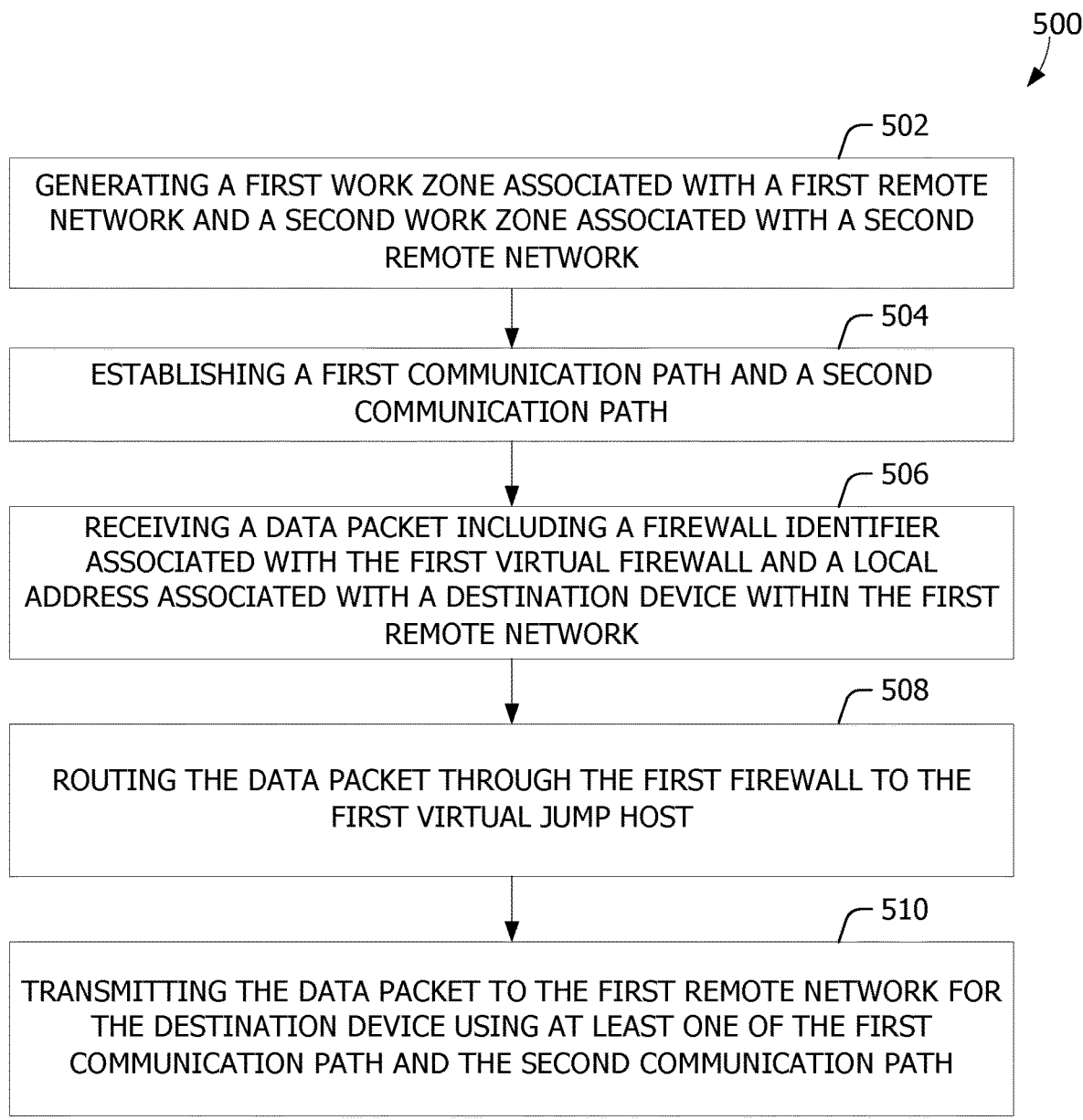

FIG. 5 is a flow diagram of an example method 500 for managing data access to remote networks in a global network 100 (shown in FIG. 1). Method 500 is at least partially performed using an NM system, such as system 102 (shown in FIG. 1). In the example embodiment, method 500 is at least partially performed by virtual platform of system 102. In other embodiments, method 500 includes additional, fewer, or alternative steps, including those described elsewhere herein.

To being method 500, the NM system generates 502 a first work zone associated with a first remote network and a second work zone associated with a second remote network. Each work zone includes a virtual firewall and a virtual jump host. The virtual firewall is associated with a firewall identifier that is used to identify data packets intended for the corresponding remote network. The NM system establishes 504 a first communication path and a second communication path using an MPLS network system. The first and second communication paths are established between the first virtual jump host of the first work zone and the first remote network. In some embodiments, a third communication path and a fourth communication path are established between the second virtual jump host of the second work zone and the second remote network.

The NM system then receives 506 a data packet including the firewall identifier associated with the first virtual firewall of the first work zone. The first virtual firewall detects the firewall identifier and routes 508 the data packet through to the first virtual jump host. Other virtual firewalls block the data packet based on the firewall identifier to prevent transmission of the data packet to unintended devices and networks. The data packet also includes a local address of a destination device within the first remote network. When the data packet is received by the first virtual jump host, the first virtual jump host transmits 510 the data packet to the first remote network for the destination device using at least one of the first and second communication paths. In the example embodiment, both communication paths are used to transmit the data packet.

Figure 6:
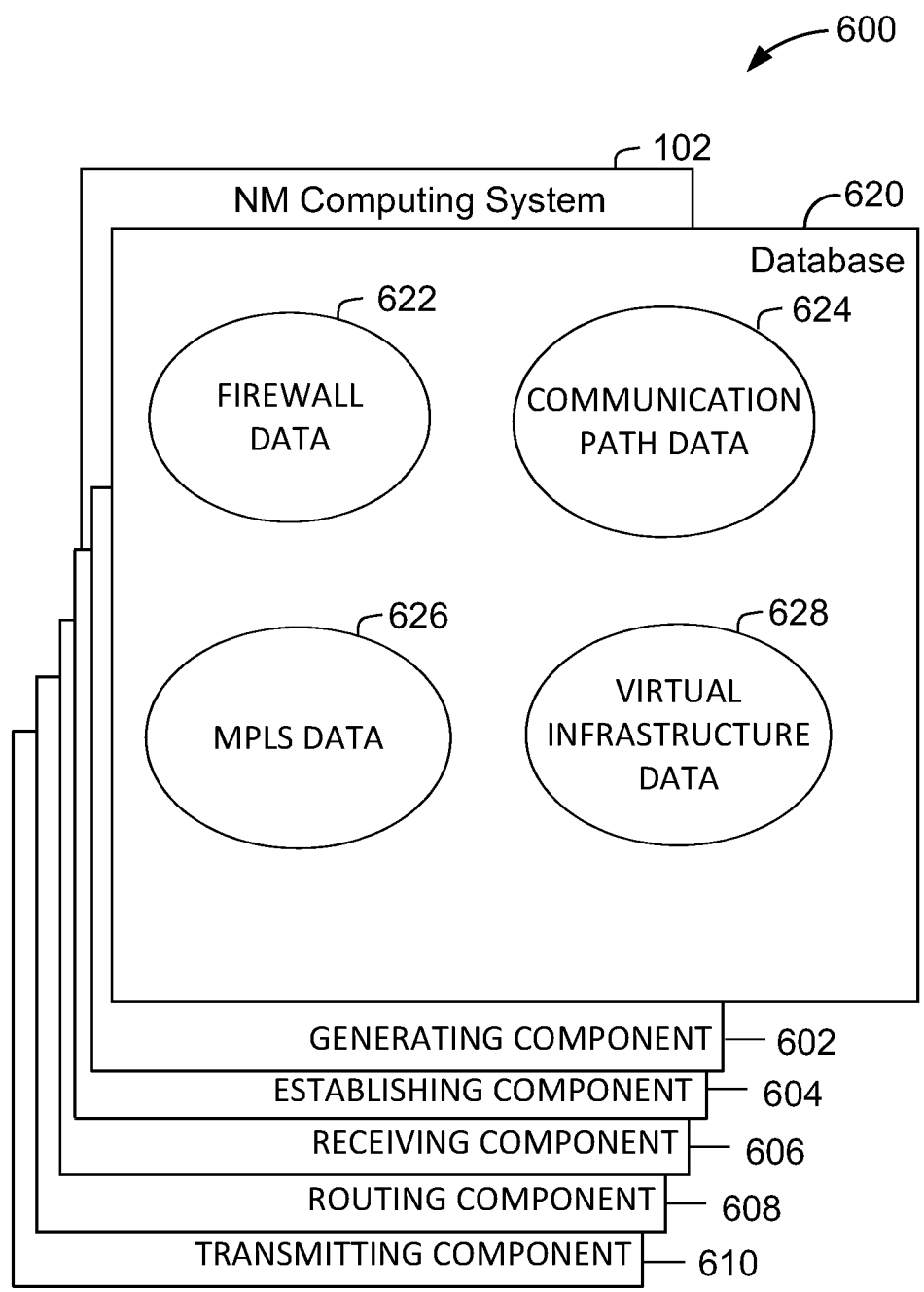

FIG. 6 is a diagram 600 of components of one or more example computing devices that may be used in the method shown in FIG. 5. FIG. 6 further shows a configuration of a database system 620 coupled to several separate components within virtual platform 104 (shown in FIG. 1), which perform specific tasks.

Virtual platform 104 includes a generating component 602 configured to generate a first work zone associated with a first remote network and a second work zone associated with a second remote network. Virtual platform 104 further includes an establishing component 604 configured to establish a first communication path and a second communication path between a first virtual jump host of the first work zone and the first remote network via an MPLS network system (e.g., system 110, shown in FIG. 1). Virtual platform 104 also includes a receiving component 606 configured to receive a data packet including a firewall identifier associated with a first virtual firewall of the first work zone and a local address associated with a destination device within the first remote network. Virtual platform 104 further includes a routing component 608 configured to route the received data packet through the first virtual firewall to the first virtual jump host based on the firewall identifier. Virtual platform 104 also includes a transmitting component 610 configured to transmit the data packet using the first virtual jump host to the first remote network for the destination device using at least one of the first communication path and the second communication path.

In an exemplary embodiment database system 620 is divided into a plurality of sections, including but not limited to, a firewall data section 622, a communication path data section 624, an MPLS data section 626, and a virtual infrastructure data section 628. Firewall data section 622 may include data associated with the virtual firewalls, such as the firewall identifiers of the virtual firewalls. Communication path data section 624 may include data defining each communication path through the global network. MPLS data section 626 may include data associated with MPLS network system. Virtual infrastructure data section 628 may include data identifying various virtual instances within the global network, such as, but not limited to, virtual jump hosts and virtual instances of NNI and CE devices. These sections are interconnected through virtual platform 104 to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A network management (NM) computing system comprising at least one processor and a memory in communication with the at least one processor, wherein the at least one processor is interposed in network communication between a multiprotocol layer switching (MPLS) network system and a primary network and is programmed to:

execute a virtual platform;

generate, on the virtual platform, a first work zone associated with a first remote network and a second work zone associated with a second remote network, the first and second remote networks each in communication with the MPLS network system, the first work zone comprising a first virtual firewall and a first virtual jump host, and the second work zone comprising a second virtual firewall and a second virtual jump host, wherein the first work zone is isolated from the second work zone by the first virtual firewall and the second virtual firewall;

establish a first communication path and a second communication path between the first virtual jump host and the first remote network via the MPLS network system;

receive, from the primary network, a data packet including a firewall identifier uniquely identifying the first virtual firewall and a local address associated with a destination device within the first remote network;

route the data packet through the first virtual firewall, wherein the first virtual firewall modifies the data packet by removing the firewall identifier from the data packet, and wherein the first virtual firewall forwards the modified data packet to the first virtual jump host; and transmit, by the first virtual jump host, the data packet to the first remote network for the destination device using at least one of the first communication path and the second communication path.

2. The NM computing system in accordance with claim 1, wherein the first communication path comprises:

a first subpath configured to transmit management data for managing the first remote network; and a second subpath configured to provide access to data stored within the first remote network.

3. The NM computing system in accordance with claim 1, wherein the at least one processor is further programmed to:

assign a priority indicator to the data packet;

advertise the data packet without the priority indicator to the first communication path for transmission of the data packet; and advertise the data packet with the priority indicator to the second communication path to prioritize transmission of the data packet using one of the first communication path and the second communication path.

4. The NM computing system in accordance with claim 3, wherein the priority indicator is a border gateway protocol (BGP) prepend, and the MPLS network system is configured to prioritize transmission of the data packet using the first communication path.

5. The NM computing system in accordance with claim 1, wherein the at least one processor is further programmed to extract the firewall identifier from the data packet when routing the data packet to the first virtual jump host.

6. The NM computing system in accordance with claim 1, wherein the at least one processor is further programmed to:
establish the first communication path via a first MPLS network of the MPLS network system; and
establish the second communication path via a second MPLS network of the MPLS network system.

7. The NM computing system in accordance with claim 1, wherein the at least one processor is further programmed to:
establish a third communication path and a fourth communication path between the second virtual jump host and the second remote network via the MPLS network system;
receive a second data packet including a firewall identifier associated with the second firewall and a local address associated with a second destination device within the second network, wherein the destination device within the first network and the second destination device within the second network have the same local address;
route the second data packet through the second firewall to the second virtual jump host; and
transmit, by the second virtual jump host, the data packet to the second remote network for the second destination device using at least one of the third communication path and the fourth communication path.

8. The NM computing system in accordance with claim 1, wherein the at least one processor is further programmed to transmit the data packet to a network-to-network interface (NNI) device configured to transmit the data packet to a customer edge (CE) device communicatively coupled to the MPLS network system to transmit the data packet to a service delivery point (SDP) device of the first remote network, wherein the first communication path and the second communication path are virtually separate from each other.

9. The NM computing system in accordance with claim 8, wherein the at least one processor is further programmed to:
establish the first communication path using a first SDP device of the first remote network; and
establish the second communication path using a second SDP device of the first remote network.

10. A method for managing access to remote networks, the method comprising:
executing, by a network management (NM) computing system, a virtual platform, wherein the NM computing system is interposed in network communication between a multiprotocol layer switching (MPLS) network system and a primary network;
generating on the virtual platform, by the NM computing system, a first work zone associated with a first remote network and a second work zone associated with a second remote network, the first and second remote networks each in communication with the MPLS network system, the first work zone comprising a first virtual firewall and a first virtual jump host, and the second work zone comprising a second virtual firewall and a second virtual jump host, wherein the first work zone is isolated from the second work zone by the first virtual firewall and the second virtual firewall;
establishing, by the NM computing system, a first communication path and a second communication path between the first virtual jump host and the first remote network via the MPLS network system;
receiving from the primary network, by the NM computing system, a data packet including a firewall identifier uniquely identifying the first virtual firewall and a local address associated with a destination device within the first remote network;
routing the data packet through the first virtual firewall, wherein the first virtual firewall modifies the data packet by removing the firewall identifier from the data packet, and wherein the first virtual firewall forwards the modified data packet to the first virtual jump host; and
transmitting, by the first virtual jump host, the data packet to the first remote network for the destination device using at least one of the first communication path and the second communication path.

11. The method in accordance with claim 10, wherein transmitting the data packet further comprises:
assigning a priority indicator to the data packet;
advertising the data packet without the priority indicator to the first communication path for transmission of the data packet; and
advertising the data packet with the priority indicator to the second communication path to prioritize transmission of the data packet using one of the first communication path and the second communication path.

12. The method in accordance with claim 11, wherein the priority indicator is a border gateway protocol (BGP) prepend, and the MPLS network system is configured to prioritize transmission of the data packet using the first communication path.

13. The method in accordance with claim 10, wherein establishing the first communication path and the second communication path further comprises:
establishing the first communication path via a first MPLS network of the MPLS network system; and
establishing the second communication path via a second MPLS network of the MPLS network system.

14. The method in accordance with claim 10 further comprising:
establishing, by the NM computing system, a third communication path and a fourth communication path between the second virtual jump host and the second remote network via the MPLS network system;
receiving, by the NM computing system, a second data packet including a firewall identifier associated with the second firewall and a local address associated with a second destination device within the second network, wherein the destination device within the first network and the second destination device within the second network have the same local address;
routing the second data packet through the second firewall to the second virtual jump host; and
transmitting, by the second virtual jump host, the data packet to the second remote network for the second destination device using at least one of the third communication path and the fourth communication path.

15. The method in accordance with claim 10, wherein establishing the first communication path and the second communication path further comprises:
communicatively couple the first virtual jump host to a first virtual instance of a network-to-network (NNI) device using virtual routing and forwarding (VRF); and communicatively couple the second virtual jump host to a second virtual instance of the NNI device using VRF, wherein the second virtual instance is isolated from the first virtual instance.

16. The method in accordance with claim 15, wherein establishing the first communication path and the second communication path further comprises:
communicatively couple the NNI device to a plurality of customer edge (CE) devices, wherein the plurality of CE devices are in communication with the MPLS network system; and
communicatively couple the MPLS network system to a service delivery point (SDP) device of the first remote network, wherein the data packet is transmitted to the SDP device to deliver the data packet to the destination device.

17. The method in accordance with claim 15, wherein communicatively coupling the MPLS network system to the SDP device further comprises:
communicatively couple the MPLS network system to a first SDP device of the first remote network, wherein the first communication path is established using the first SDP device; and
communicatively couple the MPLS network system to a second SDP device of the first remote network device, wherein the second communication path is established using the second SDP device.

18. At least one non-transitory computer-readable storage media having computer-executable instructions embodied thereon, wherein when executed by at least one processor interposed in network communication between a multiprotocol layer switching (MPLS) network system and a primary network, the computer-executable instructions cause the at least one processor to:
execute a virtual platform;
generate, on the virtual platform, a first work zone associated with a first remote network and a second work zone associated with a second remote network, the first and second remote networks each in communication with the MPLS network system, the first work zone comprising a first virtual firewall and a first virtual jump host, and the second work zone comprising a second virtual firewall and a second virtual jump host, wherein the first work zone is isolated from the second work zone by the first virtual firewall and the second virtual firewall;
establish a first communication path and a second communication path between the first virtual jump host and the first remote network via the MPLS network system;
receive, from the primary network, a data packet including a firewall identifier uniquely identifying the first virtual firewall and a local address associated with a destination device within the first remote network;
route the data packet through the first virtual firewall, wherein the first virtual firewall modifies the data packet by removing the firewall identifier from the data packet, and wherein the first virtual firewall forwards the modified data packet to the first virtual jump host; and
transmit, by the first virtual jump host, the data packet to the first remote network for the destination device using at least one of the first communication path and the second communication path.

19. The computer-readable storage media in accordance with claim 18, wherein the computer-executable instructions further cause the at least one processor to:
assign a priority indicator to the data packet;
advertise the data packet without the priority indicator to the first communication path for transmission of the data packet; and
advertise the data packet with the priority indicator to the second communication path to prioritize transmission of the data packet using one of the first communication path and the second communication path.

20. The computer-readable storage media in accordance with claim 18, wherein the computer-executable instructions further cause the at least one processor to:
establish the first communication path via a first MPLS network of the MPLS network system; and
establish the second communication path via a second MPLS network of the MPLS network system.

21. The computer-readable storage media in accordance with claim 18, wherein the computer-executable instructions further cause the at least one processor to:
establish a third communication path and a fourth communication path between the second virtual jump host and the second remote network via the MPLS network system;
receive a second data packet including a firewall identifier associated with the second firewall and a local address associated with a second destination device within the second network, wherein the destination device within the first network and the second destination device within the second network have the same local address;
route the second data packet through the second firewall to the second virtual jump host; and
transmit, by the second virtual jump host, the data packet to the second remote network for the second destination device using at least one of the third communication path and the fourth communication path.

22. The computer-readable storage media in accordance with claim 18, wherein the computer-executable instructions further cause the at least one processor to transmit the data packet to a network-to-network interface (NNI) device configured to transmit the data packet to a customer edge (CE) device communicatively coupled to the MPLS network system to transmit the data packet to a service delivery point (SDP) device of the first remote network, wherein the first communication path and the second communication path are virtually separate from each other.

23. The computer-readable storage media in accordance with claim 18, wherein the computer-executable instructions further cause the at least one processor to:
establish the first communication path using a first SDP device of the first remote network; and
establish the second communication path using a second SDP device of the first remote network.

* * * * *